United States Patent [19]

Haruna et al.

[11] Patent Number: 4,661,125
[45] Date of Patent: Apr. 28, 1987

[54] PROCESS FOR PRODUCING HIGH CONCENTRATION OXYGEN BY A PRESSURE-SWING-ADSORPTION METHOD

[75] Inventors: Kazuo Haruna; Saburo Hayashi, both of Kakogawa, Japan

[73] Assignee: Seitetsu Kagaku Co., Ltd., Hyogo, Japan

[21] Appl. No.: 734,511

[22] Filed: May 16, 1985

[30] Foreign Application Priority Data

May 22, 1984 [JP] Japan ................... 59-104239

[51] Int. Cl.⁴ .............................................. B01D 53/04
[52] U.S. Cl. ............................................. 55/26; 55/58; 55/62; 55/68
[58] Field of Search ................... 55/25, 26, 58, 62, 68, 55/75

[56] References Cited

U.S. PATENT DOCUMENTS

| | | | |
|---|---|---|---|
| 3,237,377 | 3/1966 | Skarstrom | 55/58 X |
| 3,738,087 | 6/1973 | McCombs | 55/58 |
| 3,923,477 | 12/1975 | Armond et al. | 55/58 X |
| 3,957,463 | 5/1976 | Drissel et al. | 55/58 X |
| 4,190,424 | 2/1980 | Armond et al. | 55/58 |
| 4,386,945 | 6/1983 | Gardner | 55/58 X |
| 4,519,813 | 5/1985 | Hagiwara et al. | 55/58 X |
| 4,529,412 | 7/1985 | Hayashi et al. | 55/25 |
| 4,539,020 | 9/1985 | Sakuraya et al. | 55/58 X |

Primary Examiner—Robert Spitzer
Attorney, Agent, or Firm—Pollock, Vande Sande & Priddy

[57] ABSTRACT

In production of high concentration oxygen by a pressure-swing-adsorption method using air as a raw material, air is introduced into a first step adsorption apparatus packed with a zeolite molecular sieve and is subjected to a pressure-swing-adsorption operation to obtain a non-adsorbed gas comprising oxygen as the major component, argon and nitrogen; the non-adsorbed gas is introduced into a second step adsorption apparatus packed with a carbon molecular sieve and is subjected to a pressure-swing-adsorption operation to separate argon and nitrogen from oxygen as a non-adsorbed gas; and the desorbed oxygen is obtained as high concentration oxygen.

7 Claims, 3 Drawing Figures

FIG. 3

| VALVE NO. | 55 SEC | 1.5 SEC | 3.5 SEC | 55 SEC | 1.5 SEC | 3.5 SEC |
|---|---|---|---|---|---|---|
| 18 | OPEN | | | | | OPEN |
| 19 | | | OPEN | OPEN | | |
| 20 | | | OPEN | OPEN | | |
| 21 | OPEN | | | | | OPEN |
| 22 | | OPEN | | | OPEN | |
| 23 | | OPEN | | | OPEN | |
| 24 | OPEN | | | | | |
| 25 | | | | OPEN | | |
| COLUMN I | ADSORPTION | | | DESORPTION | | |
| COLUMN II | DESORPTION | | | ADSORPTION | | |

PRESSURE EQUALIZATION — PRESSURIZATION — PRESSURE EQUALIZATION — PRESSURIZATION — DESORPTION

▨ OPEN

PROCESS FOR PRODUCING HIGH CONCENTRATION OXYGEN BY A PRESSURE-SWING-ADSORPTION METHOD

BACKGROUND OF THE INVENTION

This invention relates to a process for producing high concentration oxygen by a pressure-swing-adsorption method (hereinunder referred to as a PSA method) using air as a raw material.

In a conventional process for producing oxygen by a PSA method using air as a raw material, air is subjected to adsorption by a zeolite molecular sieve having small pore diameters of 5Å or thereabout which is packed in two or more adsorption columns, under an atmospheric or higher pressure and then desorption is made under a pressure lower than an atmospheric pressure, to obtain oxygen of up to 95% concentration.

In this case, the zeolite molecular sieve having small pore diameters of 5Å or thereabout characteristically adsorbs nitrogen in preference to oxygen and argon. However, even if an assumption is made that nitrogen can be completely adsorbed and as a result the concentrations of oxygen and argon can be increased from 20.9% and 0.9% in air, respectively to maximum about 5 times said values, respectively, the concentration of oxygen can not be increased to higher than about 95% because of the copresence of about 5% of argon. In fact, there is known no process for producing oxygen of a concentration higher than 95% by a PSA method.

SUMMARY OF THE INVENTION

An object of the present invention is to provide a process for producing high concentration oxygen, namely, oxygen of a concentration higher than 95% with an industrial advantage.

Another object of the present invention is to provide a process for inexpensively producing high concentration oxygen in order to replace liquid oxygen.

According to the present invention, an argon-containing oxygen obtained by a PSA method conducted in a first step adsorption apparatus packed with a zeolite molecular sieve is introduced into a second step adsorption apparatus comprising three adsorption columns each packed with a carbon molecular sieve having small pore diameters of 3 to 4Å or thereabout and is subjected to a PSA operation, whereby oxygen is preferentially adsorbed by the carbon molecular sieve and argon is separated from oxygen as a non-adsorbed gas.

Accordingly, the present invention relates to a process for producing high concentration oxygen by a PSA method using air as a raw material, wherein air is introduced into a first step adsorption apparatus packed with a zeolite molecular sieve and is subjected to a PSA operation to obtain a non-adsorbed gas comprising oxygen as the major component, argon and nitrogen, the non-adsorbed gas is introduced into a second step adsorption apparatus packed with a carbon molecular sieve and is subjected to a PSA operation to separate argon and nitrogen from oxygen as a non-adsorbed gas, and the desorbed oxygen is obtained as high concentration oxygen. The present invention further relates to a process for producing high concentration oxygen by a PSA method using air as a raw material, wherein air is introduced into a first step adsorption apparatus packed with a zeolite molecular sieve and is subjected to a PSA operation to obtain a non-adsorbed gas comprising oxygen as the major component, argon and nitrogen, the non-adsorbed gas is introduced into a second step adsorption apparatus packed with a carbon molecular sieve and is subjected to a PSA operation to conduct adsorption and desorption of oxygen, the argon-and nitrogen-containing oxygen separated as a non-adsorbed gas is introduced into a third step adsorption apparatus packed with a carbon molecular sieve and is subjected to a PSA operation and this desorbed oxygen is cycled to a feed gas for the second step adsorption apparatus to increase the recovery of oxygen.

In a short period of 1 to 2 min, the carbon molecular sieve allows oxygen to diffuse inside its micro pores faster than nitrogen and argon. By utilizing this difference in adsorption rate, oxygen was preferentially adsorbed and then desorbed, whereby high concentration oxygen could be recovered. As a result, the present inventors have succeeded in production of high concentration oxygen having a concentration of 99% or higher.

High concentration oxygen produced in conventional PSA methods has a maximum concentration of 95%. Therefore, use of this oxygen in all industrial applications of liquid oxygen has been impossible. Now that high concentration oxygen can easily be obtained from air by a particular PSA method, it has become possible that high concentration oxygen corresponding to liquid oxygen be produced and used inexpensively wherever and whenever needed.

In the present invention, the first step PSA apparatus packed with a zeolite molecular sieve is operated according to an ordinary manner; the PSA apparatus packed with a carbon molecular sieve comprises a second step apparatus and a third step apparatus, and generally the second step apparatus comprises an adsorption-pressure equalization-desorption cycle, and the third step apparatus comprises a pressurization-adsorption-pressure equalization-desorption cycle. The adsorption is conducted under a pressure of 1 to 3 kg/cm² G and the desorption is conducted under a pressure of 400 Torr or less, preferably 200 Torr or less. These conditions are economically most advantageous from the points of apparatus size, oxygen recovery, electricity consumption, and so forth.

BRIEF DESCRIPTION OF THE DRAWINGS

FIG. 3 shows the sequence and time cycle of the third step adsorption apparatus of FIG. 1.

DETAILED DESCRIPTION OF THE INVENTION

Hereinunder, the embodiment of the present invention will specifically be explained with reference to the accompanying drawings.

Figure 1:
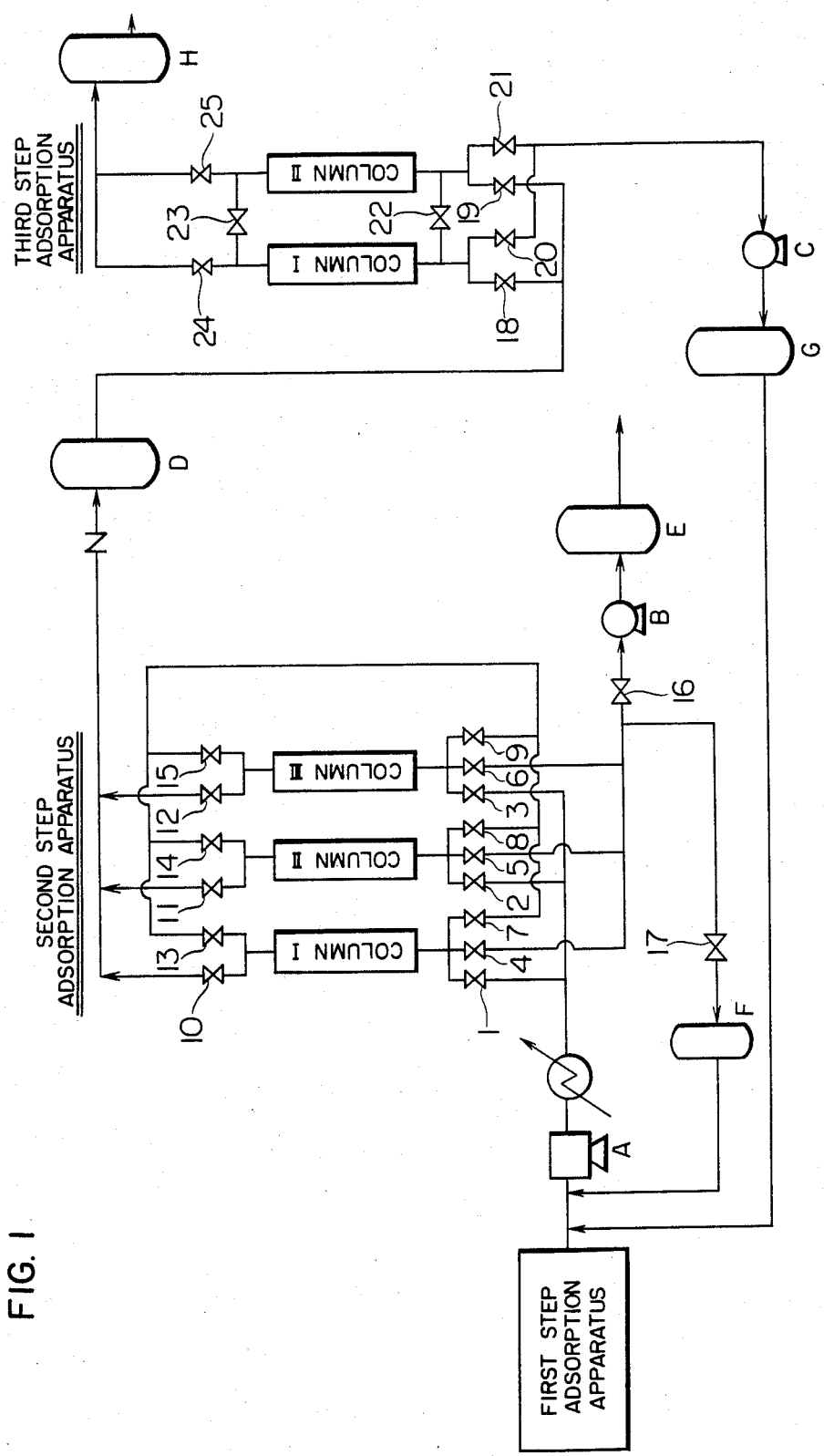
FIG. 1 is a flow sheet comprising first, second and third step adsorption apparatuses, showing an embodiment of the present invention.

In FIG. 1, in a first step adsorption apparatus packed with a zeolite molecular sieve capable of selectively adsorbing nitrogen, air as a raw material is subjected to a PSA operation to obtain, as a non-adsorbed gas, a gas containing at least 93% of oxygen.

This gas is pressurized to about 3 kg/cm² G by a compressor A and is introduced into columns I and III of a second step adsorption apparatus packed with a carbon molecular sieve capable of selectively adsorbing oxygen, in the order of the column I and the column III, through valves 1, 13, 9 and 12, to allow the columns I and III to adsorb oxygen. The gas after adsorption containing about 80% of oxygen is discharged into a receiver D.

Meanwhile, the oxygen previously adsorbed in a column II is exhausted and introduced into a buffer tank F through valves 5 and 17, subjected to pressure stabilization therein and returned to the inlet of the compressor A. This operation is conducted only for about 5 seconds at the initial stage of desorption because, at the initial stage of desorption, the oxygen concentration in desorbed gas is about equal to that in raw material gas and a gas containing 99% of oxygen can not be obtained. At the later stage of desorption, that is, for about 53 seconds, the column II is subjected to a vacuum of about 150 Torr by a vacuum pump B and the desorbed, high concentration oxygen of at least 99% concentration is introduced into a receiver E through a valve 16 and stored therein.

Next, the column I which has completed twice adsorption and the column II which has completed desorption are connected through valves 4, 5, 13 and 14, to make equal the pressures of these two columns, and then the gas present in the column I is recovered. For the first cycle of the sequence of the second step adsorption apparatus shown in FIG. 2, valves 1, 3, 9, 12, 5, 17, 16, 4, and 14 are open.

Figure 2:
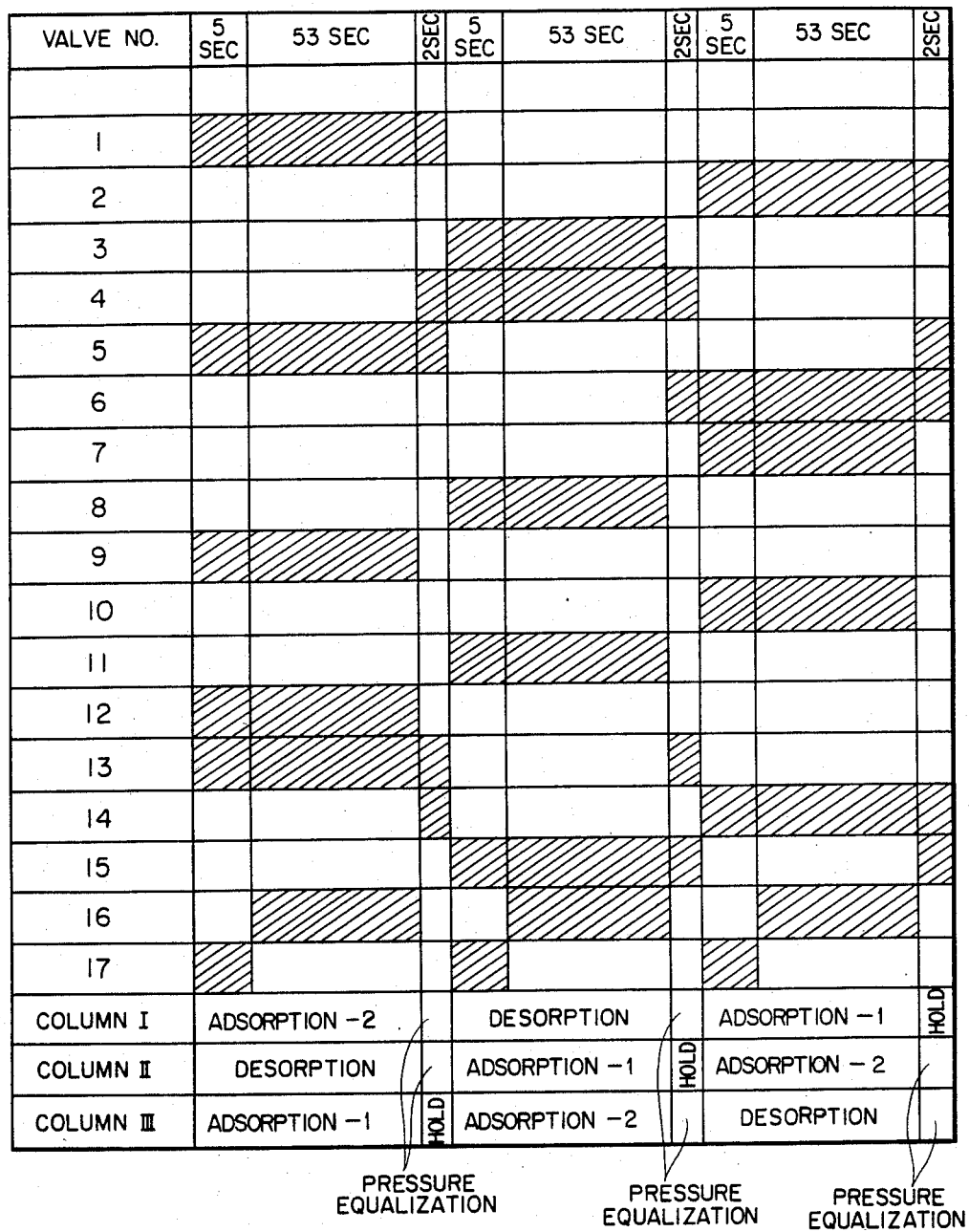
FIG. 2 shows the sequence and time cycle of the second step adsorption apparatus of FIG. 1.

According to the above stated procedure, the second step adsorption apparatus repeats an operation as shown in FIG. 2, consisting of a cycle of about 3 min. In the second cycle valves 3, 4, 6, 8, 11, 13, 15, 16, and 17 are open, and valves 2, 5, 6, 7, 10, 14, 15, 16, and 17 are open for the third cycle shown in FIG. 2.

In a third step adsorption apparatus, a gas from the second step adsorption apparatus comprising approximately 80% of oxygen and other components consisting substantially of argon and having a pressure of 1.5 to 2.0 kg/cm$^2$ G is introduced into a column I through a valve 18 and is subjected to oxygen adsorption and then a gas containing about 60% of oxygen is discharged into a receiver H through a valve 24. The column I after oxygen adsorption is connected to a column II which has completed oxygen desorption, through valves 22 and 23, whereby the pressures of the columns I and II are made equal and then the gas present in the column I is recovered. Next, by opening a valve 20, the column I is subjected to desorption and a gas containing about 93% of oxygen is desorbed by a vacuum pump C, stored in a buffer tank G and returned to the inlet of the compressor A of the second step adsorption apparatus. The column II after pressure equalization is subjected to pressurization by a gas introduced through a valve 19 and then to adsorption. In the same manner, valves 18, 19, 20, 21, 22, 23, and 25 are open to provide the proper gas flow.

In accordance with the above stated procedure, the third step adsorption apparatus repeats an operation as shown in FIG. 3, consisting of a cycle of about 2 min.

The second and third step adsorption apparatuses which are a characteristic of the present invention will further be explained. The second step adsorption apparatus is for recovering high concentration oxygen as a desorbed gas while the third step adsorption apparatus is for returning, for increasing an oxygen yield, a desorbed gas of high oxygen content to a raw material gas for the second step adsorption apparatus. By this arrangement, at least 90% of the oxygen from the first step adsorption apparatus can be recovered.

The sequence of the second step adsorption apparatus is characterized in that during adsorption, a raw material gas is introduced into two adsorption columns in series and adsorbed therein and during desorption, the column which exists at an upper stream side and has adsorbed oxygen to a saturation point is made vacuum for desorption and recovery of high concentration oxygen. In this case, before said desorption of high concentration oxygen, the column at an upper stream is connected to a column which has completed desorption, for pressure equalization and then the gas present in the column at an upper stream is recovered. Thereafter, this column is subjected to desorption by pressure reduction, wherein the desorbed gas of the initial desorption stage is cycled to the raw material gas of the second step adsorption apparatus because of the former's similarity in composition to the raw material gas and the desorbed gas of the later desorption stage is recovered as high concentration oxygen.

In FIG. 1, it is possible that, in order to omit the vacuum pumps B and C, adsorption be conducted in a pressure ranging from 3 to 10 kg/cm$^2$ G and desorption be conducted at about an atmospheric pressure, in the second and third step adsorption apparatuses. In this case, it is necessary that the discharge pressure of the compressor A be kept at 3 to 10 kg/cm$^2$ G and the suction pressure be at or below an atmospheric pressure.

The present invention will be illustrated in more detail below by way of Examples but is in no way restricted to these Examples.

EXAMPLE 1

Air as a raw material was subjected to a PSA operation in a first step adsorption apparatus comprising three columns each of 800 mm (diameter)×2,500 mm (height) and packed with a zeolite molecular sieve having small pore diameters of 5Å or thereabout manufactured by BAYER, West Germany, wherein the adsorption pressure was 500 mm H$_2$O and the desorption pressure was 150 Torr. The nonadsorbed gas containing 93.3% of oxygen was pressurized to 3.0 kg/cm$^2$ G by a compressor and introduced into a second step adsorption apparatus comprising three columns each of 200 mm (diameter)×1,100 mm (height) and packed with a carbon molecular sieve having small pore diameters of 3 to 4Å or thereabout manufactured by Bergbau Forchung G.m.b.H. of West Germany where a PSA operation was conducted in accordance with a sequence of 58 sec of adsorption-1, 2 sec of holding (a stage where nothing was conducted), 58 sec of adsorption-2, 2 sec of pressure equalization, 58 sec of desorption and 2 sec of pressure equalization (the total time of one cycle was 3 min).

In this PSA operation, the adsorption pressure was 2.6 kg/cm$^2$ G; the desorption pressure was 160 Torr; the gas volume at the inlet of the compressor was 22.8 Nm$^3$/hr; the oxygen concentration of the raw material gas was 93.3%; the volume of the gas discharged from the second step adsorption apparatus and fed to a third step adsorption apparatus was 6.4 Nm$^3$/hr; the oxygen concentration of the gas fed to the third step adsorption apparatus was 75%; the volume of the desorbed gas as a high concentration oxygen product was 20.0 Nm$^3$/hr; and the oxygen concentration of the desorbed gas was 99.3%. In this operation, the desorbed gas was returned to the inlet of the compressor, only for 5 sec at the initial stage of desorption.

Thereafter, a PSA operation was conducted in the third step adsorption apparatus comprising two columns each of 125 mm (diameter)×1,100 mm (height) and packed with the same carbon molecular sieve as used in the second step adsorption apparatus, manufactured by Bergbau Forchung G.m.b.H. of West Germany.

In this PSA operation, there was used a sequence consisting of 55 sec of adsorption, 1.5 sec of pressure equalization, 58.5 sec of desorption, 1.5 sec of pressure equalization and 3.5 sec of pressurization (the total time of one cycle was 2 min). The adsorption pressure was 0.9 kg/cm$^2$ G; the desorption pressure was 150 Torr; the volume of the gas discharged from the third step adsorption apparatus was 2.8 Nm$^2$/hr; the oxygen concentration of this gas was 50%; and the desorbed gas was returned to the inlet of the compressor of the second step adsorption apparatus.

From the above operations, high concentration oxygen of 99.3% concentration was obtained at a recovery of 93.4%.

EXAMPLE 2

The gas containing 93.3% of oxygen discharged from the first step adsorption apparatus of Example 1 was pressurized to 6.5 kg/cm$^2$ G and introduced into a second step adsorption apparatus comprising three adsorption columns each the same as used in Example 1 and of 200 mm (diameter)×1,100 mm (height). In the apparatus, the gas was subjected to a PSA operation with a sequence consisting of 58 sec of adsorption-1, 2 sec of holding (a stage where nothing was conducted), 58 sec of adsorption-2, 2 sec of pressure equalization, 58 sec of desorption and 2 sec of pressure equalization (the total time of one cycle was 3 min).

In this PSA operation, the adsorption pressure was 6.3 kg/cm$^2$ G and the desorption pressure was almost an atmospheric pressure (no vacuum pump was installed).

The volume of the gas at the inlet of the compressor was 23.6 Nm$^3$/hr; the oxygen concentration of the gas was 93.3%; the volume of the gas discharged from the second step adsorption apparatus and fed into a third step adsorption apparatus was 18.3 Nm$^3$/hr; the oxygen concentration of the gas was 80.6%; the volume of the desorbed gas as a high concentration oxygen product was 18.4 Nm$^3$/hr; and the oxygen concentration of the desorbed gas was 99.2%. The desorbed gas was returned to the inlet of the compressor for 6 sec at the initial stage of desorption.

Further, a PSA operation was conducted in the third step adsorption apparatus comprising two adsorption columns each the same as used in Example 1 and of 125 mm (diameter)×1,100 mm (height).

In this PSA operation, there was used a sequence consisting of 55 sec of adsorption, 1.5 sec of pressure equalization, 58.5 sec of desorption, 1.5 sec of pressure equalization and 3.5 sec of pressurization (the total time of one cycle was 2 min). The adsorption pressure was 5.8 kg/cm$^2$ G and the desorption pressure was an atmospheric pressure (no vacuum pump was installed). The volume of the gas discharged from the third step adsorption apparatus was 5.2 Nm$^3$/hr and the oxygen concentration of the gas was 71.2%. The desorbed gas was returned to the inlet of the second step adsorption apparatus.

From the above operations, high concentration oxygen of 99.2% concentration was obtained at a recovery of 83.2% which was lower than that of Example 1.

What is claimed is:

1. A process for producing high concentrations of oxygen by a pressure-swing-adsorption method using air as a raw material; characterized by introducing air into a first step adsorption apparatus packed with a zeolite molecular sieve; subjecting the air to a pressure-swing-adsorption therein to obtain a non-adsorbed gas containing oxygen as the major component, nitrogen and argon; introducing the non-adsorbed gas into a second step adsorption apparatus comprising three columns packed with a carbon molecular sieve; subjecting the gas to a pressure-swing-adsorption operation therein to conduct a desorption of the adsorbed oxygen and obtain a desorbed gas as high concentration oxygen having high concentration of 99% or above, and to separate a non-adsorbed gas which is an oxygen gas containing argon and nitrogen; introducing the non-adsorbed gas into a third step adsorption apparatus comprising two columns packed with a carbon molecular sieve; subjecting the gas to a pressure-swing-adsorption operation therein to conduct desorption of the adsorbed oxygen; and returning the desorbed oxygen to the raw material gas of the second step adsorption apparatus to enhance the total recovery of oxygen.

2. A process according to claim 1, wherein the adsorption pressures of the second and third step adsorption apparatuses are 0.3 to 10 Kg/cm$^2$G.

3. A process according to claim 1 wherein the desorption pressure of the first step adsorption apparatus ranges from 150 mmHg to atmospheric pressure.

4. A process according to claim 1 wherein the desorption pressures of the second and third step adsorption apparatuses range from 90 mmHg to atmospheric pressure.

5. A process according to claim 1 wherein the non-adsorbed gas containing oxygen as the major component discharged from the first step adsorption apparatus is introduced in order into two columns of the three columns of the second step adsorption apparatus, desorption of oxygen is conducted firstly in one of the columns which is at an upper stream side and whose oxygen adsorption has reached a saturation point, and the desorbed gas at the initial stage of desorption is recovered as the raw material gas for the second step adsorption apparatus and the desorbed gas at the later stage of desorption is obtained as high concentration oxygen.

6. A process according to claim 1, wherein the adsorption pressure of the first step adsorption apparatus ranges from an atmospheric pressure to 0.1 kg/cm$^2$ G.

7. A process according to claim 1, wherein the second step adsorption apparatus comprises 3 columns and the third step adsorption apparatus comprises 2 columns.

* * * * *